(12) United States Patent
Brehm

(10) Patent No.: US 6,410,610 B1
(45) Date of Patent: Jun. 25, 2002

(54) METHOD FOR PRODUCING CATIONIC POLYELECTROLYTES

(75) Inventor: Helmut Brehm, Krefeld (DE)

(73) Assignee: Stockhausen GmbH & Co. KG, Krefeld (DE)

(*) Notice: Subject to any disclaimer, the term of this patent is extended or adjusted under 35 U.S.C. 154(b) by 0 days.

(21) Appl. No.: 09/529,406

(22) PCT Filed: Sep. 29, 1998

(86) PCT No.: PCT/EP98/06179

§ 371 (c)(1),
(2), (4) Date: Apr. 26, 2000

(87) PCT Pub. No.: WO99/23120

PCT Pub. Date: May 14, 1999

(30) Foreign Application Priority Data

Oct. 31, 1997 (DE) ........................................ 197 48 153

(51) Int. Cl.⁷ ................. C08F 2/50; C08F 2/46
(52) U.S. Cl. ................. 522/84; 522/5; 522/24; 522/28; 522/30; 522/60; 522/61; 522/1; 522/150; 522/151; 522/152; 522/175; 522/173
(58) Field of Search ................. 522/5, 13, 24, 522/60, 61, 84, 150, 151, 152, 175, 173, 62, 30, 28, 1

(56) References Cited

U.S. PATENT DOCUMENTS

| | | | | |
|---|---|---|---|---|
| 3,607,691 A | * | 9/1971 | Goldberg et al. | 204/159.23 |
| 3,912,607 A | * | 10/1975 | Communal et al. | 204/159.23 |
| 4,218,356 A | * | 8/1980 | Evans et al. | 260/29.6 |
| 4,325,794 A | * | 4/1982 | Hunter et al. | 204/159.23 |
| 4,647,598 A | * | 3/1987 | Yada et al. | 522/3 |
| 4,762,862 A | * | 8/1988 | Yada et al. | 522/3 |
| 5,049,383 A | * | 9/1991 | Huth et al. | 424/405 |
| 5,185,385 A | * | 2/1993 | Kanluen et al. | 522/84 |

* cited by examiner

Primary Examiner—James J. Seidleck
Assistant Examiner—Sanza L McClendon
(74) Attorney, Agent, or Firm—Oblon, Spivak, McClelland, Maier & Neustadt, P.C.

(57) ABSTRACT

A process for producing water-soluble, cationic polyelectrolytes is described, wherein the polymerization of the water-soluble monomers is initiated at low temperatures using a combination of UV light, photoinitiator and a redox system, and is characterized in that the redox system is capable of initiating the polymerization only at temperatures higher than or equal to 20° C. The polymers have a high molecular weight and a low content of residual monomer.

16 Claims, No Drawings

METHOD FOR PRODUCING CATIONIC POLYELECTROLYTES

The invention relates to a process for the production of water-soluble, powdered, cationic polyelectrolytes based on non-ionogenic and cationic monomers.

Copolymers of acrylamide and cationic monomers are used in waste water treatment and paper manufacturing, for example. It is their purpose to coagulate colloidal particles in aqueous suspensions to form mechanically stable flakes which settle readily or can easily be filtrated.

It is desirable for economic reasons to achieve high settling rates and high filtration rates of the coagulated particles with a minimum of polyelectrolyte input. High effectiveness in the clarification of aqueous suspensions is presented by high molecular weight cationic polyelectrolytes having good solubility.

High molecular weight cationic water-soluble copolymers are obtained when the polymerization of the aqueous monomer solution is performed at a polymerization temperature as low as possible and with small amounts of initiator.

As the viscosity of the monomer solution increases after initiating the polymerization, and a solid gel is present after a short period of polymerization, controlled heat removal is not possible, i.e., the exothermic reaction proceeds in a virtually adiabatic fashion. In order to keep the maximum polymerization temperature as low as possible, the temperature of the monomer solution at the time of initiation must be selected low at a given monomer concentration. In summary, this means that in order to produce high molecular weight cationic polymers by polymerization in aqueous solution, not only the initiation temperature and the amount of initiator, but also the monomer concentration must be kept low, the amount of initiator ranging approximately between 0.02 and 5 wt.-% and the monomer concentration approximately between 25 and 45 wt.-%. Such preconditions result in extensive problems when producing water-soluble, high molecular weight copolymers from non-ionogenic and cationic monomers because:

1) initiator systems consisting of an oxidizing agent and a reducing agent (redox system) which are sufficiently active to initiate polymerization at temperatures below 20° C., preferably below 0° C., are available in only a limited range;
2) redox systems initiating polymerization at low input and low initiation temperature are not capable of directing the polymerization to high conversion;
3) low amounts of initiator require exceedingly long periods of polymerization which do not permit a continuous design of the polymerization process;
4) low amounts of initiator result in poorly reproducible initiation and progress of the polymerization because even minor variations in the monomer quality or oxygen content of the monomer solution will give rise to significant interference with the process;
5) polymerization at low monomer concentrations not only deteriorates the space-time yield but also impedes breaking up of the hydrous, gelled polymer into separate particles, hampering the subsequent drying.

To overcome the above-demonstrated problems in the production of high molecular weight, water-soluble polymers, the EP 0,296,331 suggests initiation of the polymerization at temperatures below 0° C. in the presence of dispersed monomer crystals. The polymerization is initiated using the well-known redox system consisting of ammonium persulfate and ammonium iron(II) sulfate which reacts sensitively to traces of oxygen. This redox system does not provide sufficient conversion, however, and for that reason 2,2'-azobis(2-amidinopropane) dihydrochloride (ABAH) is also added, which provides free radicals by thermal decomposition. The thermal decomposition of this azo initiator becomes apparent by an accelerated polymerization from about 45° C. on, and as a consequence, the molecular weight of the polymers formed decreases with increasing polymerization temperature. The residual monomer content of acrylamide is 970 ppm, and such high values in the polymer cannot be accepted for toxicological reasons.

In order to produce high molecular weight polyacrylamides by polymerizing acrylamide or acrylamide including other comonomers in aqueous solution, the U.S. Pat. No. 4,455,411 claims an initiator system consisting of a peroxodisulfate and the sodium formaldehyde sulfoxylate (=sodium hydroxymethanesulfinic acid=Rongalit C®) reducing agent, as well as the 2,2'-azobis(2-amidinopropane) dihydrochloride (ABAH) already mentioned above. Also, the initiator system appears to be insensitive to varying purity of the monomer used. Example 8 describes the production of a cationic polyelectrolyte. The copolymerization of acrylamide with quaternized dimethylaminoethyl methacrylate is initiated with the redox system at 20° C. and carried on to high conversion by using 403 ppm. of ABAH.

As has been illustrated, the production of high molecular weight, well-soluble polyelectrolytes necessarily requires a low initiation temperature, i.e., a temperature of the monomer solution of below 20° C., preferably below 10° C.

In contrast to redox polymerization, the photopolymerization of a monomer solution in the presence of an initiator providing free radicals by irradiation with UV light is largely independent of the initiation temperature (Chemical Reviews, Vol. 68, No. 2, Mar. 25, 1968). The disadvantage of photopolymerization results from the Lambert-Beer Law which states that the light intensity in the irradiated monomer solution decreases exponentially with increasing layer thickness. For this reason, photochemical reactions should be stirred vigorously in order to replace reacted product in the reaction zone by new substrate.

In continuous processes for producing high molecular weight, water-soluble polymers, such as described in EP 0,296,331 A2, Example 4, intimate mixing of the polymerizing solution is not possible because immediately after starting the polymerization initiated by a redox initiator system of iron ammonium sulfate/ammonium persulfate with addition of an azo initiator, it would solidify to give a solid gel which can no longer be stirred.

The DOS 27 16 606 suggests performing the continuous production of water-soluble acrylic polymers by photopolymerization, preferably at a layer thickness of the monomer solution of from 3 to 8 mm on a mobile support. In order to decrease the residual monomer content of the polymers obtained compared to those polymers obtained according to the process of DAS 2,050,988, it is necessary according to claim 1d) to irradiate the polymer layer after removal from the support for preferably another 40 to 90 minutes. According to Example 4, the residual content of acrylamide in the polymer is 600 ppm despite the use of 240 ppm of benzoin propyl ether and 75 minutes irradiation time. Such long polymerization periods with thin layer thickness result in poor space-time yields. The tackiness of the polymers obtained as determined by the applicant is a consequence of the thin polymerizing layer, i.e., the unfavorable ratio of volume to surface results in an increase of low molecular weight tacky components forming at the phase boundary, particularly towards the gaseous phase.

To produce water-soluble, low molecular weight polymers, the DOS 22 48 715 suggests performing the photopolymerization in a thin layer using benzoin propyl ether and an accelerator. The accelerator consists of azobisisobutyronitrile or the persulfate/bisulfite redox system.

A process for the continuous production of polymers and copolymers of water-soluble monomers is known from EP 0,228,638 A1, wherein polymerization of the aqueous monomer solution takes place between −10° C. and 120° C. on a mobile conveyor belt, initiated by chemical initiation and/or high-energy radiation/light. Polymers having a low content of residual monomer and gel have not been described.

Cationic copolymers of acrylamide and dimethylaminopropylacrylamide as flocculant can be inferred from EP 0,228,637 B1. The initiation of polymerization can be triggered using redox systems, thermally decomposing initiators, or free radicals formed by photochemical means.

Crosslinked polymers absorbing aqueous liquids are known from DE 40 15 085 C2, which are characterized by a high absorptive capacity under pressure and a low residual monomer content. According to this invention, polymerization is initiated using a redox initiator system of formamidinosulfinic acid and organic peroxides; in addition, the polymerization may also be initiated using UV light. Azo compounds may also be added as additional components of the polymerization initiators. Water-soluble polymers have not been described in this patent.

Referring to the state of the art, there is no process known for producing cationic water-soluble polyelectrolytes, which would initiate polymerization at low temperatures in a short, technically acceptable period of time, permit formation of polymers having high molecular weights of more than 1 million and—avoiding large amounts of expensive azo initiators—exhibit low ratios of residual monomers and gel.

It is the object of the present invention to provide a process for the production of high molecular weight, water-soluble, cationic polymers, permitting polymerization of monomer solutions with a layer thickness of more than 1 cm at initiation temperatures of below 20° C., preferably below 10° C. This new process should be largely insensitive to residual oxygen in the monomer solution and varying monomer quality.

The new adiabatic polymerization process should be controllable both in the lower and upper temperature ranges. According to the new process, the content of toxic residual monomers in the polymer should be below 500 ppm, preferably below 100 ppm, without requiring addition of large amounts of expensive azo initiator.

Said object was accomplished by irradiating a monomer solution with light at a temperature of below 20° C. in the presence of A) a photoinitiator and B) a redox system, characterized in that the redox system is capable of initiating the polymerization only at temperatures higher than or equal to 20° C.

In redox system B), hydroperoxides such as tert-butyl hydroperoxide and cumene hydroperoxide are used as oxidizing agents. Conventionally, from 1 to 1000 ppm, preferably from 10 ppm to 500 ppm, and more preferably from 10 ppm to 200 ppm of organic hydroperoxide is used, based on monomer solution. Suitable as reducing agents are sulfinic acids or salts of sulfinic acids such as sodium hydroxymethanesulfinate, p-toluenesulfinic acid and formamidinosulfinic acid. Here, amounts of from 0.1 to 1000 ppm, preferably from 1 to 500 ppm, and more preferably from 10 to 250 ppm are conventionally used, based on monomer solution.

For example, benzoin derivatives such as benzoin isopropyl ether or benzil dimethyl ketal, azo initiators such as 2,2'-azobis(2-amidinopropane) dihydrochloride or 2,2'-azobisisobutyronitrile are used as photoinitiators forming free radicals upon exposure to light, which have a polymerization-initiating effect. The amount of photoinitiators is from 5 to 500 ppm, preferably from 5 to 100 ppm.

Despite of rapid gelling of the polymerizing monomer solution, the adiabatic polymerization process according to the invention is largely controllable. Within a temperature range of below 30° C., the progress of polymerization, i.e., the amount of free radicals formed, can be determined by way of type and concentration of the photoinitiator as well as the irradiation intensity. Thus, in contrast to other initiator systems, the surprisingly high insensitivity of the process according to the invention to residual amounts of oxygen in the monomer solution enables initiation of the polymerization without delay and therefore, a higher production rate as well.

As a result of good controllability of the polymerization process, it is also possible to maintain the concentration of the monomer solution in the upper range, with no unintended, difficult to control temperature peaks occurring.

Another advantage of the process according to the invention is that it is possible to disperse the initiators thoroughly in the monomer solution during the continuous production process, e.g., in a static mixer, with no premature initiation of polymerization and thus, blocking of the metering systems occurring prior to applying the monomer solution onto the polymerization belt.

Initiation of polymerization is effected by irradiating the monomer solution cooled down to below 20° C., preferably below 10° C., and more preferably below 0° C. It is preferred to irradiate using UV light having a wavelength of from 300 to 400 nm. Advantageously, UV lamps can be used where the radiation component has a maximum at a wavelength of 360 nm (e.g., TL09, Philips Company).

The layer thickness of the irradiated monomer solution is at least 1 cm, preferably more than 2 cm, with more than 4 cm being particularly preferred.

As a result of the exothermic reaction initiated by irradiating the monomer solution, the temperature in the polymerizing solution rises, reaching the initiation temperature of the redox system above 20° C. The amount of the redox components and the ratio of oxidizing agents to reducing agents will determine the progress of polymerization at elevated temperatures, so that the molecular weight of the polymers is not decreased by free radicals present in excess and yet, high conversion is achieved at the same time.

Surprisingly, high molecular weights of more than 1 million and at the same time, residual contents of toxic monomer of less than 200 ppm, preferably less than 100 ppm, and more preferably less than 50 ppm are achieved in the claimed photopolymerization process in the presence of a redox system.

According to the new process, water-soluble, high molecular weight, cationic copolymers can be produced in particularly high quality by polymerizing cationic monomers such as N,N-dialkylaminoalkyl (meth)acrylates, N,N-dialkylaminoalkyl(meth)acrylamides as salts or in quaternized form with non-ionogenic monomers such as acrylamide, methacrylamide and N-alkyl(meth)acrylamides.

The ratio of cationic to non-ionogenic monomers is from 98:2 to 2:98 wt.-%.

Uncontrolled effects of heavy metal salts such as Cu, Fe or Mn ions on the redox system can largely be eliminated by adding chelating substances to the monomer solution.

Examples of such chelating substances are diethylenetriamine-pentaacetic acid (Versenex®, DTPA) and ethylenediaminetetra-acetic acid (EDTA).

Preferably, the polymerization process is performed continuously in boxes situated on a moving support or on an elastic conveyor belt pressed by lateral rolls into concave shape across the conveying direction, so that the monomer solution may form a layer more than 1 cm in height. The belt unit is situated in a tunnel-like housing from which the vapors formed are sucked off through a waste gas washer.

In order to perform the photopolymerization, individually switchable UV fluorescent lamps adjustable in height are installed at the housing top.

One drawback of this continuous plant is that the monomer solution in the tray- or box-shaped open-top polymerization tank is in direct contact with the gaseous phase in the tunnel housing, which cannot be maintained free of oxygen. Although the oxygen content of the monomer solution before entering the polymerization plant is reduced to below 1 ppm by purging with nitrogen, it will increase again by exchange with the gaseous phase in the tunnel in the top layer of the monomer solution, thereby inhibiting polymerization and reducing conversion, respectively. This drawback is overcome by the process claimed according to the invention, so that the polymerization can be effected even at an elevated oxygen content in the monomer solution of 1 ppm, for example, without a time-delaying inhibition phase.

Following polymerization, the hot gel block is pre-crushed in a kneader and optionally treated with oxidation stabilizers, pH stabilizers or conditioners as described in DE 41 23 889 A1 and DE 41 27 814 A1, for example. In particular, treatment of the polymer gel according to the procedure of DE 37 24 709 A1 is preferred in order to reduce the ratio of insolubles (gel fraction) and further decrease the residual monomer content. Following granulation to a grain size of from 1 to 5 mm in an extruder, the gel is dried in a stream of hot air and subsequently milled.

The cationic polymers produced according to the process of the invention are particularly advantageous in the purification of municipal and industrial waste waters, as well as in flocculation procedures in paper manufacturing, because they have excellent flocculating activity and low contents of toxic residual monomer.

EXAMPLES

Methods of Determination

To determine the characteristic values, the powdered polymers of the grain fraction from 150 to 850 $\mu$m obtained according to the examples are tested as follows.

1. Viscosity in Salt Solution

In a 400 ml beaker, 3.4 g of polymer is dissolved in 302.6 g of desalted water over 60 minutes with stirring. Following addition of 34 g of sodium chloride, stirring is continued for another 15 minutes and then the Brookfield viscosity is measured at 20° C. and 10 rpm using spindle No. 1.

2. Acrylamide (ACA)Residual Monomer

The determination is performed using HPLC.

3. Insolubles—Gel Content 0.80 g of powdered polymer is weighed in a 1000 ml beaker and dissolved in 800 ml of water of 25° d with stirring. Following a dissolution period of 60 minutes, the solution is filtrated through a 315 $\mu$m standard screen, and the residue is washed 5 times with 1 l of water. The volume of the residue is determined in a measuring cylinder.

Gel content [ml/l]=Residue [ml/l]×1.2

4. Intrinsic Viscosity

The determination is effected by measuring the flow times of polymer solutions of various concentrations prepared using a 10% sodium chloride solution in a Ubbelohde viscometer at 20° C. The intrinsic viscosity [$\eta$] is expressed in [ml/g].

Comparative Examples 1–4

These Comparative Examples illustrate that initiator systems consisting of an azo initiator and the sulfinic acid/hydroperoxide redox system will not initiate polymerization without irradiation.

273.6 g of a commercially available 50% acrylamide solution stabilized with 30 ppm of $Cu^{2+}$, 532 g of a 60% aqueous solution of dimethylaminopropylacrylamide quaternized with methyl chloride, 380 g of softened water, and 75 ppm of Versenex 80 (DOW Company) as a 25% solution were weighed into an open-top plastic tray. The layer thickness of the monomer solution was 8 cm. With stirring using a magnetic stirrer, the monomer solution is adjusted to a pH value of 4.5 using about 4 g of 50% sulfuric acid and to the initiation temperature indicated in Table 1. The oxygen content is decreased to 0.1 ppm by bubble-injecting nitrogen, and the initiators indicated in Table 1 are added, each one dissolved in 2 g of water. The temperature progress is measured and recorded using electronic means.

TABLE 1

| Comparison | Init. Temp. ° C. | ABAH[1] ppm | t-BHP[2] ppm | HMS[3] ppm | Result |
|---|---|---|---|---|---|
| 1 | 6 | 200 | 80 | 80 | |
| 2 | 0.6 | 200 | 120 | 120 | No |
| 3 | 10 | 200 | 80 | 120 | polymerization[4] |
| 4 | 20 | 200 | 120 | 120 | |

[1]2,2'-Azobis(2-amidinopropane) × 2HCl.
[2]tert-Butyl hydroperoxide.
[3]Hydroxymethanesulfinic acid Na.
[4]After 40 minutes residence time.

Examples 1–4

Charge and procedure of Comparative Examples 1–4 are repeated, with the measure that after adding the initiators, the surface of the monomer solution is irradiated using a UV lamp having its major component of radiation at 365 nm. The irradiation intensity at the liquid surface is 2000 $\mu$W/cm$^2$. As can be seen from the temperature rise, the polymerization starts within 120 seconds. 30 minutes after reaching the maximum temperature, the gelled polymer block is removed from the tray, crushed in a meat grinder with addition of 20 ml of a 6% hydroxylamine chloride solution and dried at 110° C. within 1.25 hours. Following grinding, the screen fraction from 150 to 1850 $\mu$m is tested.

TABLE 2

| Example | ABAH ppm | t-BHP ppm | HMS ppm | Initiation temp. °C. | Polym. time min | Temp. max. °C. | Visc. mPa·s | Gel ml | ACA[5] ppm |
|---|---|---|---|---|---|---|---|---|---|
| 1 | 200 | 80 | 80 | +5.3 | 30 | 65 | 510 | 20 | 170 |
| 2 | 200 | 120 | 120 | −5.0 | 33 | 57 | 650 | 13 | 30 |
| 3 | 200 | 80 | 120 | +5.0 | 26.5 | 67 | 480 | 9 | 50 |
| 4 | 200 | 120 | 180 | −5.0 | 28 | 58 | 720 | 19 | 60 |

[5]Acrylamide residual monomer

Comparative Examples 5–8

Charge and procedure as in Examples 1–4 are repeated, with the measure that—following the experimental examples of EP 228,637 B1—only an azo initiator (ABAH)/UV light is used as initiator. It appears that low residual monomer and gel contents can only be achieved by means of exceedingly high amounts of azo initiator.

TABLE 3

| Comparative Experiment | ABAH ppm | Init. temp. °C. | Polym. time min | Temp. max. °C. | Visc. mPa·s | Gel ml | ACA ppm |
|---|---|---|---|---|---|---|---|
| 5 | 200 | +5 | 53.5 | 63 | 2100 | >100 | 1300 |
| 6 | 200 | −5 | 56 | 53.5 | 2160 | >100 | 1600 |
| 7 | 800 | +5 | 34 | 52 | 470 | 21 | 220 |
| 8 | 800 | −5 | 39 | 59 | 615 | 30 | 200 |

Comparative Examples 9 and 10

The procedure of Comparative Example 1 is repeated. Here, operation is performed following Example 8 of U.S. Pat. No. 4,455,411. It appears, however, that polymerization cannot be initiated within an acceptable period of time when using the described redox initiator system at low temperatures.

300 g of a 50% acrylamide solution stabilized with 30 ppm of $CU^{2+}$, 188 g of an 80% solution of dimethylaminoethyl acrylate quaternized with methyl chloride, 506 g of completely desalted water, and 75 ppm of Versenex 80 are weighed in. With stirring using a magnetic stirrer, the pH value is adjusted with about 4.5 g of 50% sulfuric acid to 3.5 and the initiation temperature to 20° C. The oxygen content is decreased to 0.1 ppm by bubble-injecting nitrogen, and the initiators indicated in Table 4 are added, each one dissolved in 2 g of water.

TABLE 4

| Comparative Experiment | ABAH ppm | APDS[1] ppm | HMS ppm | Result |
|---|---|---|---|---|
| 9 | 400 | 10 | 10 | No polymerization after 50 minutes |
| 10 | 400 | 20 | 40 | |

[1]Ammonium peroxodisulfate

Comparative Examples 11–13

The Comparative Examples 9 and 10 are repeated using the process of Example 4. It is demonstrated that using the peroxide not in accordance with the invention results in high amounts of residual monomer.

TABLE 5

| Comparative Experiment | ABAH ppm | APDS ppm | HMS ppm | Polym. time min | Temp. max. °C. | Visc. mPa·s | Gel ml | ACA ppm |
|---|---|---|---|---|---|---|---|---|
| 11 | 400 | 10 | 10 | 18 | 53 | 910 | 20 | 1650 |
| 12 | 200 | 50 | 50 | 22 | 50 | 1380 | 45 | 1500 |
| 13 | 400 | 50 | 50 | 16 | 53 | 835 | 21 | 930 |

Example 5

274 g of a 50% acrylamide solution stabilized with 30 ppm of copper(II) ions, 399 g of an 80% solution of dimethylaminoethyl acrylate quaternized with methyl chloride, 516 g of completely desalted water, and 75 ppm of Versenex 80 are weighed into an open-top plastic tray. The layer thickness of the monomer solution is 8.5 cm. The pH value is adjusted to 3.5 using 50% sulfuric acid with stirring. During cooling to −5° C. the oxygen content of the solution is decreased to 0.1 ppm by purging with nitrogen, and 200 ppm of ABAH, 120 ppm of t-BHP and 180 ppm of sodium hydroxymethanesulfinic acid are added, each one dissolved in 2 ml of water. After switching off the stirrer, the solution is irradiated using a Philips Company TL 09 fluorescent lamp. The irradiation intensity at the surface of the monomer solution is 2000 $\mu W/cm^2$. After a polymerization period of 16 minutes, the maximum temperature of 58° C. is reached. Following a 30 minutes standing period, the gel block is crushed with addition of 1.2 g of hydroxylamine hydrochloride dissolved in 20 ml of water. After drying at 110° C. in a circulating air drying oven and milling, the screen fraction from 150 to 850 $\mu m$ is tested with respect to its properties. Viscosity: 610 mPa.s; gel:<5 ml; acrylamide: 190 ppm.

Example 6

0.18 g of Versenex 80 as a 40% solution, 510.72 g of a 50% acrylamide solution, 134.4 g of a 60% solution of N-acrylamidopropyltrimethylammonium chloride, and 547.3 g of water are weighed into a tray. The pH value of the solution is adjusted to 4.5 using 1.3 g of 50% sulfuric acid. After purging with nitrogen and cooling to −5° C., 200 ppm of ABAH, 60 ppm of t-BHP, and 50 ppm of sodium hydroxymethanesulfinic acid are added. Polymerization is initiated by irradiating the monomer solution with 1500 $\mu W/cm^2$ at a frequency of 365 nm. The maximum temperature of 63° C. is reached after 18 minutes. The completely polymerized gel is then further treated as described in the examples above. The properties of the final product were as follows:
Viscosity: 620 mPa.s; gel: 10 ml; acrylamide: 110 ppm.

Example 7

The following items are weighed into a tray having a bottom area of 100 $cm^2$: 1.3 g of 50% sulfuric acid, 0.18 g of Versenex 80 as a 40% solution, 273.6 g of a 50% acrylamide solution, 532 g of a 60% solution of N-acrylamidopropyltrimethylammonium chloride, and 380 g of crushed ice. After cooling to −5° C. and decreasing the oxygen content to 0.1 ppm, 10 ppm of benzil dimethyl ketal dissolved in 1.2 g of acrylic acid, 120 ppm of cumene hydroperoxide dissolved in 1.44 g of acrylic acid, and 180 ppm of Na hydroxymethanesulfinic acid in 2.16 g of water are added. Irradiating with UV light as in Example 6 causes the temperature to rise to 60° C. within 24 minutes. After working up the polymer gel as in Example 5, a powdered polymer having the following characteristic values is recovered:
Viscosity: 395 mPa.s; gel:<5 ml; acrylamide: 20 ppm.

Example 8

Example 7 is repeated using the following initiator combination: 10 ppm of O-ethylbenzoin in 1.2 g of acrylic acid, 120 ppm of tert-butyl hydroperoxide in 2.88 g of water, and 180 ppm of Na hydroxymethanesulfinic acid in 2.16 g of water. The following product properties were found:
Viscosity: 440 mPa.s; gel<5 ml; acrylamide: 50 ppm.

Example 9

Example 8 is repeated, with the measure that 30 ppm of 4-benzoylbenzoic acid sodium salt is used as photoinitiator. The product properties were as follows:
Viscosity: 430 mPa.s; gel:<5 ml; acrylamide: 60 ppm.

Example 10

Example 4 is repeated, with the variation that the polymerization is initiated with an oxygen content of the monomer solution of 1 ppm.

| Polym. time min | Max. temp. ° C. | Visc. mPa · s | Gel ml | ACA ppm |
| --- | --- | --- | --- | --- |
| 25 | 57 | 760 | 22 | 40 |

Example 11

Example 7 is repeated using an initiator system consisting of 30 ppm of benzil dimethyl ketal in 3.6 g of acrylic acid, 80 ppm of tert-butyl hydroperoxide in 1.92 g of water, and 500 ppm of p-toluenesulfinic acid sodium salt in 6 g of water.

| Polym. time min | Max. temp. ° C. | Visc. mPa · s | Gel ml | ACA ppm |
| --- | --- | --- | --- | --- |
| 22 | 55 | 530 | 10 | 40 |

Example 12

The following items are weighed into a stirred tank: 2058 kg of a 50% acrylamide solution having a content of 33 ppm of copper(II) ions, 2615 kg of softened water, 0.7 kg of Versenex 80, and 4000 kg of a 60% solution of N-dimethylaminopropylacrylamide quaternized with methyl chloride. The pH value of the monomer solution is adjusted to 4.5 using about 15 kg of 50% sulfuric acid. 400 kg of monomer solution is withdrawn from the stirred tank every hour and cooled continuously to −5° C., purged with nitrogen to a residual oxygen content of 0.9 ppm, and metered onto a conveyor belt as described in EP-A-0,228,638. Prior to application onto the conveyor belt, the monomer solution is mixed with the following initiator solutions: 8.6 l/h 1% ABAH solution, 7.8 l/h 1% solution of hydroxymethanesulfinic acid sodium salt, and 10.3 l/h 0.5% tert-butyl hydroperoxide solution. The polymerization is initiated—as can be recognized by rapid gelling of the monomer solution—by irradiation with fluorescent lamps wherein the major component of radiation is at a frequency of 360 nm. The average irradiation intensity at the surface of the monomer solution is 1200 $\mu W/cm^2$. After a residence time of 45 minutes, the solid gel strand is removed from the conveyor belt and crushed in a meat grinder with addition of 10.5 l/h 10% hydroxylamine hydrochloride solution. The gel is dried to a residual water content of about 10% on a belt dryer at an air temperature of 110° C. within 75 minutes. Thereafter, the polymer is milled and screened. The polymer having a grain size of 0.09–1.4 mm has the following characteristic values:
Viscosity: 620 mPa.s; gel: 8 ml; residual acrylamide: 50 ppm; viscosity of a 1% aqueous solution: 7450 mPa.s.

Comparative Example 14

This is to demonstrate that polymerization using a redox system initiating below 20° C. will result in high residual monomer amounts.

The following items are weighed into a cylindrical vessel equipped with a magnetic stirrer: 596 g of completely desalted water, 151.2 g of acrylamide (Fluka Co.), and 441 g of 80% 2-dimethylaminoethyl acrylate quaternized with methyl chloride (Ageflex FA1Q80MC, CPS Chemical Company). The pH value of the solution is adjusted to 4.5 using 50% sulfuric acid. The oxygen content of the solution is decreased to 0.1 ppm by purging with nitrogen and at the same time, the temperature is adjusted to −5° C. The polymerization vessel is sealed with a cap provided with borings to accommodate a temperature sensor and enable addition of the initiators. The following aqueous initiator solutions are added with stirring: 4.8 g of a 10% ABAH solution, 0.72 g of a 1% tertbutyl hydroperoxide solution, and 1.8 g of a 1% solution of Na hydroxymethanesulfinate. After addition of 0.72 g of a 1% solution of ammonium iron(II) sulfate×6H$_2$O, the polymerization begins, as can be recognized by the temperature rise. The maximum temperature of 64° C. is reached after 16 minutes. Following a 30 minutes standing period, the gel block is crushed with addition of 4000 ppm of hydroxylammonium chloride as a 0.4% solution and dried. After milling and screening for the grain fraction from 0.09 to 1.4, the following characteristic values are determined:
Viscosity: 595 mPa.s; gel: 5 ml; residual acrylamide: 4595 ppm.

Example 13

The procedure of Example 4 is repeated, with the measure that the ratio of cationic monomer is increased to 58 mole-%. The following product properties were measured:
Viscosity: 680 mPa.s; gel: 15 ml; residual acrylamide:<10 ppm; viscosity of a 1% solution in water: 12,200 mPa.s; intrinsic viscosity (in a 10% NaCl solution): 860 ml/g.

Example 14

The procedure of Example 4 is repeated, with the measures that the monomer concentration is adjusted to 42 wt.-% and the ratio of cationic monomer is 80 mole-%.
Product properties:
Viscosity: 485 mPa.s; gel: 11 ml; residual acrylamide:<1 ppm; viscosity of a 1% solution in water: 6000 mPa.s; intrinsic viscosity (in a 10% NaCl solution): 760 ml/g.

Comparative Example 15

This is to demonstrate that the combination of UV light/azo initiator and a redox system not in accordance with the invention will result in polymers having high residual monomer contents.

The following items are weighed into an open-top cylindrical vessel equipped with a magnetic stirrer: 274 g of a 50% acrylamide solution, 516 g of desalted water, and 399 g of 60% trimethylammonium ethylacrylate chloride. Following addition of 75 ppm of Versenex 80, the pH value is adjusted to 4 using 50% sulfuric acid. During purging with nitrogen to a residual oxygen content of<0.1 ppm, the monomer solution is cooled to −5° C. (layer thickness: 8 cm). Following addition of 2.4 g of a 10% ABAH solution and 3.0 g of a 2% ammonium peroxodisulfate solution, irradiation is effected as in Example 1, and 1.2 g of a 2% sodium disulfite solution is simultaneously added with stirring. The polymerization begins immediately, as can be recognized by the temperature rise. After 21 minutes the maximum temperature of 50° C. is reached. After a standing period of another 30 minutes, a soft gel block which is difficult to crush is removed from the polymerization vessel and mixed with 4000 ppm of 0.4% hydroxylammonium chloride in water. After drying to a water content of 7.9% and milling to a grain size of from 0.09 to 1.4 mm, the following characteristic values are determined:

Viscosity: 145 mPa.s; gel:<5 ml; residual acrylamide: 4400 ppm; viscosity of a 1% solution in water: 980 mPa.s

What is claimed is:

1. A process for the production of high molecular weight, water-soluble polyelectrolytes, comprising:
adiabatically photopolymerizing a monomer combination of a non-ionogenic monomer and a cationic monomer in aqueous solution in the presence of an initiator system of:
(A) an initiator which furnishes free radicals upon irradiation with light, and
(B) a redox initiator system, the photopolymerization reaction being initiated upon irradiation of the monomer combination with light, and, as the temperature of the polymerization system increases as polymerization progresses, the redox initiator system initiating polymerization when the temperature reaches 20° C.

2. The process of claim 1, wherein the light has a wavelength ranging from 300 to 400 nm.

3. The process of claim 1, wherein the photopolymerization is initiated at a temperature below 10° C.

4. The process of claim 3, wherein the photopolymerization is initiated at a temperature below 0° C.

5. The process of claim 1, wherein the non-ionogenic monomer is acrylamide, methacrylamide or N-alkyl(meth)acrylamide.

6. The process of claim 1, wherein the ionogenic monomer is a cationic monomer selected from the group consisting of N,N-dialkylaminoalkyl(meth)acrylates and N,N-dialkylaminoalkyl(meth)acrylamides in the form of salts or quaternized.

7. The process of claim 1, wherein the monomers are present in the reaction system in a ratio of cationic to non-ionogenic monomers of 98:2 to 2:98.

8. The process of claim 1, wherein the oxidizing component of the redox initiator system consists of at least one hydroperoxide.

9. The process of claim 1, wherein the reducing component of the redox initiator system consists of at least one sulfinic acid or salt thereof.

10. The process of claim 1, wherein the process is performed continuously with a layer of monomer solution at a thickness more than 1 cm.

11. The process of claim 10, wherein the process is performed continuously with a layer of monomer solution at a thickness more than 4 cm.

12. The process of claim 1, wherein, following the polymerization, the polymer product, obtained as a gel, is crushed, subjected to a subsequent treatment and then dried.

13. A cationic polymer material consisting of monomer units of at least one cationic monomer and acrylamide prepared by the process according to claim 1.

14. The cationic polymer according to claim 13, wherein the residual acrylamide content of the copolymer is less than 200 ppm.

15. The cationic polymer according to claim 14, wherein the residual acrylamide content of the copolymer is less than 100 ppm.

16. The cationic polymer according to claim 15, wherein the residual acrylamide content of the copolymer is less than 50 ppm.

* * * * *